United States Patent
Das et al.

(10) Patent No.: US 8,289,933 B2
(45) Date of Patent: Oct. 16, 2012

(54) HYBRID TRANSMISSION METHOD FOR WIRELESS COMMUNICATIONS

(75) Inventors: Arnab Das, Old Bridge, NJ (US); Farooq Ullah Khan, Manalapan, NJ (US)

(73) Assignee: Alcatel Lucent, Paris (FR)

( * ) Notice: Subject to any disclaimer, the term of this patent is extended or adjusted under 35 U.S.C. 154(b) by 2083 days.

(21) Appl. No.: 09/982,317

(22) Filed: Oct. 18, 2001

(65) Prior Publication Data

US 2003/0096613 A1    May 22, 2003

(51) Int. Cl.
*H04J 3/00*    (2006.01)
*H04B 7/212*   (2006.01)
*H04B 7/216*   (2006.01)

(52) U.S. Cl. ........ 370/337; 370/342; 370/347; 370/441; 370/442

(58) Field of Classification Search .......... 370/329–468, 370/208, 209, 478–480; 455/450–452.1, 455/509, 511
See application file for complete search history.

(56) References Cited

U.S. PATENT DOCUMENTS

| | | | | |
|---|---|---|---|---|
| 4,763,322 | A * | 8/1988 | Eizenhofer | 370/337 |
| 5,577,024 | A * | 11/1996 | Malkamaki et al. | 370/335 |
| 5,790,549 | A * | 8/1998 | Dent | 370/479 |
| 6,018,528 | A | 1/2000 | Gitlin et al. | |
| 6,031,827 | A | 2/2000 | Rikkinen et al. | |
| 6,064,662 | A * | 5/2000 | Gitlin et al. | 370/330 |
| 6,535,503 | B1 * | 3/2003 | Toskala et al. | 370/349 |
| 6,631,124 | B1 * | 10/2003 | Koorapaty et al. | 370/337 |
| 6,665,309 | B2 * | 12/2003 | Hsu et al. | 370/441 |
| 6,721,294 | B1 * | 4/2004 | Bahrenburg et al. | 370/335 |
| 6,791,994 | B1 * | 9/2004 | Young et al. | 370/436 |
| 6,804,220 | B2 * | 10/2004 | Odenwalder et al. | 370/337 |
| 6,952,410 | B2 * | 10/2005 | Gopalakrishnan et al. | 370/335 |
| 6,952,454 | B1 * | 10/2005 | Jalali et al. | 375/260 |
| 6,996,082 | B2 * | 2/2006 | Terry et al. | 370/335 |
| 7,167,461 | B2 * | 1/2007 | Odenwalder et al. | 370/335 |
| 2003/0039204 | A1 * | 2/2003 | Tiedemann, Jr. | 370/209 |

FOREIGN PATENT DOCUMENTS

EP    0 538 546 A1    4/1993
(Continued)

OTHER PUBLICATIONS

Ojanpera et al., "Comparison of Multiple Access Schemes for UMTS", *Vehicular Technology Conference*, 1997, IEEE 47th Phoenix, AZ, USA May 4-7, 1997, pp. 490-494.

(Continued)

*Primary Examiner* — Habte Mered
(74) *Attorney, Agent, or Firm* — Capitol Patent & Trademark Law Firm, PLLC

(57) ABSTRACT

A method is described for transmitting information in a communication channel of a wireless communication system in which the communication channel is divided into a plurality of time slots of equal duration and each of the time slots is further sub-divided into multiple sub-slots or resource units. In one illustrative embodiment, the communication channel is divided into time slots according to a time division multiple access scheme. Each time slot is then further code-multiplexed into one or more sub-slots according to a code division multiple access scheme. Each of the sub-slots is therefore capable of carrying a separately coded transmission within the communication channel so that multiple simultaneous transmissions can occur in any given time slot.

13 Claims, 3 Drawing Sheets

FOREIGN PATENT DOCUMENTS

| | | |
|---|---|---|
| EP | 0 633 671 A | 1/1995 |
| EP | 0 680 168 A2 | 4/1995 |
| EP | 0 841 763 A | 5/1998 |
| EP | 0 980 153 A | 2/2000 |
| EP | 1 059 740 A | 12/2000 |
| JP | 11243380 | 6/1999 |
| WO | 01/33742 | 5/2001 |
| WO | WO 01/22742 A1 | 5/2001 |

OTHER PUBLICATIONS

Oguz Sunay, "C502000-0918-014 1xEV-DV Forward Channel Structure", *Announcement Lucent*, Sep. 20, 2000, pp. 1-29.

* cited by examiner

HYBRID TRANSMISSION METHOD FOR WIRELESS COMMUNICATIONS

TECHNICAL FIELD

The invention relates generally to wireless communication systems and, more particularly, to methods used for transmitting information in communications channels of such systems.

BACKGROUND OF THE INVENTION

In wireless communication systems, an air interface is used for the exchange of information between a mobile (e.g., cell phone) and a base station or other communication system equipment. The air interface typically comprises a plurality of communication channels and transmission over the communication channels can be carried out according to several well-known multiple access methods. Two such multiple access methods in wireless communications are time division multiple access (TDMA) and code division multiple access (CDMA).

As is well known, CDMA-based systems employ unique codes for multiplexing separate, simultaneous transmissions over a communication channel. In a CDMA-based system, transmission duration is fixed while the users share the resources in the code domain. In some systems, different resources can be allocated to different users by sharing the available code space unequally. A code-multiplexed CDMA system has several drawbacks relating to delays and memory requirements. For example, a larger fixed frame duration is generally required in a CDMA system, which leads to larger feedback delays. Additional memory is also required because the peak data rate needs to be supported over larger frame durations.

As is well known, TDMA-based systems transmit multiple digital transmissions in a communication channel by dividing the communication channel into multiple time slots so that multiple users can share the resources in the time domain. For example, a single user would be able to use all the available resources in a given time slot. By way of example, the resources include power, Walsh codes, antennas, and so on. In the well-known 1x-EV-DV standard, for example, the available resources are shared between circuit switched voice and data users within a standard 1.25 MHz channel bandwidth. Due to the real-time nature of the voice traffic, the resources (e.g., power, Walsh codes, etc.) are first allocated to voice. After satisfying the needs of real-time services, the remaining resources are then shared among the data users in a time-multiplexed fashion.

In TDMA-based systems, transmission duration can be variable in that a different amount of transmission resources can be allocated at different times. While a time-multiplexed TDMA system with variable frame duration may solve some of the aforementioned problems of code-multiplexed CDMA systems, there are other inherent drawbacks to a time-multiplexed system. For example, there is typically bandwidth inefficiency when transmitting shorter packets because the shortest frame duration cannot be smaller than one full time slot. Because all resources are allocated to a single user within a particular frame duration, resources are inefficiently used when a user only has a small amount of data to send due to padding or use of sub-optimal modulation and coding schemes. Moreover, data rate granularity is coarse because frame duration can only be multiples of one slot.

SUMMARY OF THE INVENTION

Delays are reduced and bandwidth efficiency is substantially improved in a wireless communication system according to the principles of the invention by employing a hybrid transmission method whereby a communication channel is divided into a plurality of time slots of equal duration and each of the time slots is further sub-divided into multiple sub-slots or resource units. Each of the sub-slots is capable of carrying separate, simultaneous transmissions within the communication channel.

In one illustrative embodiment, a method for transmitting information in a communication channel of a wireless communication system includes time multiplexing a plurality of time slots of equal duration in the communication channel according to a TDMA-based scheme and code multiplexing two or more sub-slots within each of the plurality of time slots according to a CDMA-based scheme. Each of the sub-slots is therefore capable of carrying a separately coded transmission within the communication channel so that multiple simultaneous transmissions can occur in any given time slot.

Accordingly, the complementary and selective combination of time multiplexing and code multiplexing in the hybrid transmission method according to the principles of the invention realizes the advantages of both techniques while avoiding the drawbacks of using only one or the other of the two techniques. For example, bandwidth efficiency is significantly improved because sub-dividing time slots and then code multiplexing within a time slot provides for a much finer data rate granularity for efficiently handling variable size packet transmissions, e.g., especially shorter packet transmissions, since the transmissions can now be carried using any number of contiguous sub-slots in one or more contiguous time slots.

BRIEF DESCRIPTION OF THE DRAWING

A more complete understanding of the present invention may be obtained from consideration of the following detailed description of the invention in conjunction with the drawing, with like elements referenced with like reference numerals, in which.

DETAILED DESCRIPTION

Figure 1:
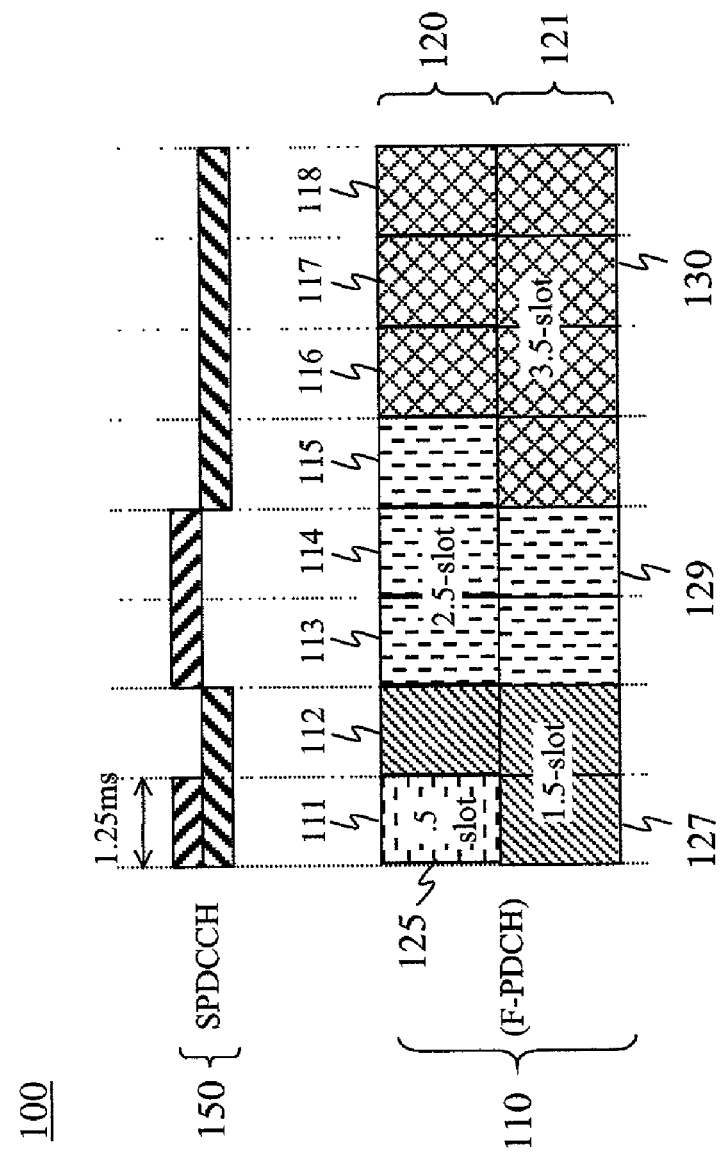
FIG. 1 shows a simplified block diagram of a communication channel format according to one exemplary embodiment of the invention.

FIG. 1 shows one exemplary embodiment of the invention in the context of wireless data transmission according to the 1xEV-DV air interface standard (evolution of the cdma2000-1x standards) for third generation (3G) wireless systems. More specifically, FIG. 1 shows a simplified block diagram of a communication channel format 100 wherein a forward packet data channel (F-PDCH) 110 is used for transmitting encoder packets, according to well-known techniques, and wherein forward secondary packet data control channel (SP-DCCH) 150 is used for transmitting control information associated with the data transmission in F-PDCH 110, again according to well-known techniques.

In the exemplary embodiment shown in FIG. 1, communication channel 100 is divided into eight (8) time slots 111-118 of equal duration, e.g., 1.25 milliseconds, according to the well-known cdma2000 standard. As shown, each of times slots 111-118 is further sub-divided into two (2) half-slots (sub-slots) 120 and 121. It should be noted that time slots 111-118 can be sub-divided into any integer number of sub-slots or resource units, e.g., four (4) quarter-slots, etc., and such sub-division is a matter of design choice. Those skilled in the art will appreciate that other considerations would need to be made, e.g., desired granularity, associated overhead requirements, and so on depending on the particular sub-division scheme that is chosen. However, in any case, the embodiments shown and described herein are meant to be illustrative only and not limiting in any way.

In one exemplary embodiment, code division multiple access (CDMA) can be used for transmitting information within each of sub-slots 120 and 121 using well-known code multiplexing techniques. In particular, each of time slots 111-118 is divided into two sub-slots 120 and 121 in the code domain, e.g., the total number of Walsh codes allocated to F-PDCH 110 can be equally or unequally divided between the two sub-slots 120 and 121. As mentioned above, it is also contemplated that the principles of the invention would apply to cases where a time slot 111-118 is sub-divided into multiple sub-slots (e.g., more than two) by allowing different sub-slots to use different chips within a given time slot 111-118.

In operation, users can be allocated transmission resources within communication channel 100 on two different levels, e.g., time slots 111-118 in the time domain as well as sub-slots 120-121, within one or more of the time slots, in the code domain. In this manner, various combinations of time slots 111-118 and sub-slots 120-121 can be used to effectively provide a variable transmission feature using a fixed time period base, e.g., fixed length frames of 1.25 millisecond duration. For example, users can be allocated a prescribed number of sub-slots 120-121 starting in any of time slots 111-118.

By way of example only, FIG. 1 shows transmission allocations over one-half (0.5) sub-slot (transmission 125), one-and-a-half (1.5) contiguous sub-slots (transmission 127), two-and-a-half (2.5) contiguous sub-slots (transmission 129), and three-and-a-half (3.5) contiguous sub-slots (transmission 130). More specifically, each of transmissions 125, 127, 129, and 130 corresponds to separate transmissions occurring within communication channel 100. Again, by way of example only, these separate transmissions could each be for separate users or could be separate transmissions for the same user. Also, as described above, these examples are meant to be illustrative only. For example, time slots 111-118 can be sub-divided into any number of sub-slots and any of time slots 111-118 could carry multiple transmissions within a single time slot, e.g., each separate transmission would be separately coded and simultaneously transmitted in a respective one or more sub-slots within such time slot. In one illustrative embodiment, the transmissions can start in any of time slots 111-118 and in either of sub-slots 120 or 121, and the sub-slots and time slots carrying a particular transmission would be contiguous as shown by the examples of FIG. 1.

In the well-known 1x-EV-DV wireless standard, 32-ary Walsh codes are used for transmission on forward packet data channel (F-PDCH) 110. According to this standard, the total Walsh space is shared between voice and data transmission. For example, data transmission on F-PDCH 110 uses the remaining Walsh codes after code allocation for voice transmission. Information about the available Walsh codes is transmitted to all users in the cell as broadcast information over the forward secondary packet data control channel (SPDCCH) 150. More specifically, a 5-bit pointer is used to indicate the number of 32-ary Walsh codes allocated to F-PDCH 110. For equal division of codes between sub-slots 120 and 121 in FIG. 1, a predefined rule can be used to determine the codes allocated to each sub-slot. For example, in the case where an even number of 32-ary Walsh codes are allocated to F-PDCH 110, the codes can be equally divided between sub-slots 120 and 121. For an odd number of 32-ary Walsh codes, the number of codes in the first sub-slot 120 can be (n+1)/2 while the number of codes in the second sub-slot 121 can be (n−1)/2, where n is the total number of 32-ary Walsh codes allocated to F-PDCH 110.

In contrast to a pure TDMA-based scheme, the transmissions supported by the hybrid format shown in FIG. 1 are not limited to just an integer number of time slots since a finer amount of data rate granularity is achieved by sub-dividing time slots into separate code-multiplexed sub-slots. In particular, the hybrid multiplexing scheme provides efficient support for shorter packet transmissions since the minimum number of resources that can be allocated to a user can be smaller than one full time slot. Moreover, the finer data rate granularity enables rate adaptation to the current channel conditions for any data block size and allows for a large number of modulation and coding schemes for the same data block size.

Figure 2:
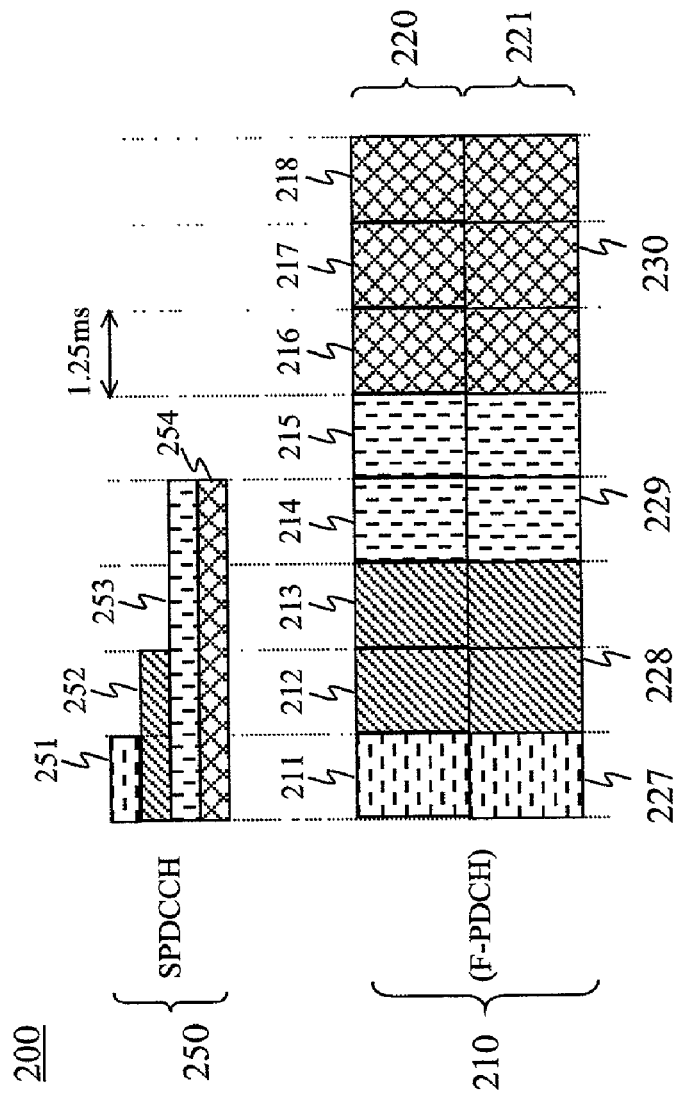
FIG. 2 shows a simplified block diagram of a communication channel format according to another exemplary embodiment of the invention.

FIG. 2 shows another exemplary embodiment of the invention in which communication channel format 200 includes forward packet data channel (F-PDCH) 210 for transmitting encoder packets according to well-known techniques, and forward secondary packet data control channel (SPDCCH) 250 for transmitting control information associated with the data transmission in F-PDCH 210, again according to well-known techniques. More specifically, FIG. 2 illustrates a signaling technique that can be used for the hybrid transmission scheme according to the principles of the invention.

As is well-known, the use of SPDCCH 250 is set forth in appropriate standards for wireless communications. For example, those skilled in the art will understand that SPDCCH 250 includes fields such as EPS (3 bits), ACID (2 bits), SPID (2 bits), MAC ID (6 bits) and CRC (8 bits). According to the principles of the invention, an additional signaling field is required in SPDCCH 250 when F-PDCH 210 is carrying transmissions that are both time and code multiplexed. According to one embodiment, SPDCCH 250 is used to convey a start position for a transmission within F-PDCH 210, e.g., a bit for identifying whether a transmission starts in sub-slot 220 or 221 in one of time slots 211-218. Alternatively, it is also possible to couple the sub-slot start with the particular SPDCCH 250 used for carrying the control information for the particular transmission in F-PDCH 210. For example, if the user receives control information on the first SPDCCH 250, this would indicate that the transmission starts in the first sub-slot in a particular time slot. On the other hand, if the control information is received on the second SPDCCH 250, the user will know that the transmission starts in the second sub-slot.

SPDCCH 250 is also used to convey the total number of contiguous sub-slots and time slots allocated for a particular transmission, e.g., one or more bits for identifying the total number of sub-slots 220 and 221 that carry the particular transmission. Table 1 shows one exemplary implementation of a 3-bit signaling field that can be used in SPDCCH 250 according to the principles of the invention.

TABLE 1

| sub-slot start (SSS) [1 bit] | '0xx' - start in the first half slot '1xx' - start in the second half slot |
|---|---|

TABLE 1-continued

| sub-slot count (SSC) [2 bits] | 'x00' - 1 sub-slot allocated 'x01' - 2 sub-slots allocated 'x10' - 3 sub-slots allocated 'x11' - 4 sub-slots allocated |
|---|---|

As shown, 3 bits can be used to convey this signaling information when each time slot is sub-divided into one-half sub-slots 220-221. More specifically, the first bit is a sub-slot start bit (SSS) that is set to either "0" or "1" to indicate whether the transmission in F-PDCH 210 starts in the first sub-slot 220 or the second sub-slot 221, respectively. The remaining two bits are the sub-slot count (SSC) which, in conjunction with the length of the particular SPDCCH as will be described below, denotes the number of sub-slots 220 and 221 allocated for a transmission in F-PDCH 210, e.g., indicating one, two, three, or four of sub-slots 220 and 221 in this example.

As shown in FIG. 2, SPDCCH 250 includes separate signaling blocks 251-254 for each corresponding separate transmission 227-230, respectively, in F-PDCH 210 in communication channel 200. In one embodiment, the length of the particular SPDCCH 251-254, in conjunction with the use of initial-state of registers in the well-known cyclic redundancy check (CRC) coding, can be used to provide a large set of sub-slot allocations with the 2-bit sub-slot count (SSC) field. Table 2 illustrates this principle according to one illustrative embodiment.

TABLE 2

| SPDCCH (251-254) Length [Time Slots] | Sub-Slot Count (SSC) | Effective Transmission Length in F-PDCH 210 [Time Slots] |
|---|---|---|
| 1 | Number of sub-slots allocated in the 1st time slot. | 0.5, 1 |
| 2 | Number of sub-slots allocated in the 2nd and 3rd time slots. | 1, 1.5, 2.0, 2.5, 3.0 |
| 4 with all '0's CRC state | Number of sub-slots allocated in the 4th and 5th time slots. | 3.0, 3.5, 4.0, 4.5, 5.0 |
| 4 with all '1' CRC state | Number of sub-slots allocated in the 6th slot or number of full slots from the 7th and 8th time slots. | 5, 5.5, 6, 6.5, 7, 7.5, 8 |

As shown, a length of one (1) slot, such as in SPDCCH 251, would indicate that the transmission in F-PDCH 210 starts and ends in the same time slot, e.g., transmission 227 in time slot 211. A length of two (2) time slots, such as SPDCCH 252, would indicate that the transmission in F-PDCH 210 can extend from one (1) to three (3) time slots. In the example shown in FIG. 2, transmission 228 spans 4 sub-slots in two (2) time slots 212-213. The differentiation between SPDCCH 253 and 254, each covering four (4) time slots, can be accomplished in one exemplary embodiment using well-known CRC techniques. For example, an "all 0's" CRC state would denote transmission in F-PDCH 210 from three (3) to five (5) time slots, while an "all 1's" CRC state would denote transmission in F-PDCH 210 from five (5) to eight (8) time slots.

Applying the above exemplary signaling technique to the transmissions shown in FIG. 1, one can see that transmission 125 is a one-half (0.5) slot transmission that would have a 3-bit sub-slot field of "000" since the transmission starts in sub-slot 120 and since the transmission starts and ends within one time slot 111. Similarly, transmission 127 is a one-and-a-half (1.5) slot transmission starting in sub-slot 121 and would therefore have a sub-slot field of "101". Transmission 129 is a two-and-a-half (2.5) slot transmission starting in sub-slot 120 and would therefore have a 3-bit sub-slot field of "010", while transmission 130 is a three-and-a-half (3.5) slot transmission starting in sub-slot 121 and would therefore have a 3-bit sub-slot field of "101". Although transmissions 127 and 130 would have the same sub-slot field "101" using this signaling technique, differentiation between the two transmissions would be done based on the length of SPDCCH 150, e.g., two (2) time slots 111-112 for SPDCCH 150 in the case of transmission 127 in F-PDCH 110 and four (4) time slots 115-118 for SPDCCH 150 in the case of transmission 130 in F-PDCH 110. Those skilled in the art will readily appreciate that other signaling implementations, e.g., using a different number of bits and so on, would also be suitable for use in the foregoing embodiments and are therefore contemplated by the teachings herein.

In operation, the length of SPDCCH (150, 250), the CRC state, the sub-slot start bit (SSS), and the sub-slot count (SSC) together determine how the sub-slots are used for a subpacket transmission in accordance with the principles of the invention. For purposes of this discussion, it is assumed that, at most, two users can be code multiplexed in a particular time slot, e.g., two sub-slots per time slot as shown in the preceding embodiments. As described, each time slot (111-118, 211-218) is divided into two sub-slots (120-121, 220-221) referred hereinafter generically as the "upper" sub-slot and "lower" sub-slot. The upper sub-slot, which corresponds to the even numbered sub-slots in Table 3 below, uses W-Floor [WIK] codes, where W is the total number of 32-ary Walsh codes available for the F-PDCH (110, 210) at the current time, and K is a configurable (e.g., semi-static) integer that indicates the manner in which the available Walsh space is apportioned between the upper and lower sub-slots. For example, both the sub-slots use an equal number of Walsh codes when K=2 and W is even. The lower sub-slot, which corresponds to the odd numbered sub-slots in Table 3 below, uses Floor [W/K] codes. As shown in the sub-slot map of Table 3, each sub-slot is numbered starting at time slot 0.

TABLE 3

| Sub-slot number | 0 1 | 2 3 | 4 5 | 6 7 | 8 9 | 10 11 | 12 13 | 14 15 |
|---|---|---|---|---|---|---|---|---|
| Time Slot number | Slot 0 | Slot 1 | Slot 2 | Slot 3 | Slot 4 | Slot 5 | Slot 6 | Slot 7 |

Table 4 below shows the sub-slots that will be used for a subpacket transmission to a user for a given combination of the length of the SPDCCH, the CRC state, the value of the sub-slot start (SSS) field, and the value of the sub-slot count (SSC) field. $N_w$ is the total number of 32-ary Walsh codes used for the given combination of SPDCCH length, CRC state, SSS field, and SSC field. For simplicity of explanation and illustration, let $W_U$=W-Floor[W/K], and $W_L$=Floor[W/K].

TABLE 4

| SPDCCH length | CRC state | SSS + SSC | Slots used for sub-packet transmission - partially or fully (see Table 3) | Sub-slot usage map | $N_w$ |
|---|---|---|---|---|---|
| 1 | 0 | 000 | 0 | 0 | $W_U$ |
| 1 | 0 | 001 | 0 | 0 to 1 | W |

TABLE 4-continued

| SPDCCH length | CRC state | SSS + SSC | Slots used for sub-packet transmission - partially or fully (see Table 3) | Sub-slot usage map | $N_w$ |
|---|---|---|---|---|---|
| 1 | 0 | 010 | N/A | N/A | N/A |
| 1 | 0 | 011 | N/A | N/A | N/A |
| 1 | 0 | 100 | 0 | 1 | $W_L$ |
| 1 | 0 | 101 | N/A | N/A | N/A |
| 1 | 0 | 110 | N/A | N/A | N/A |
| 1 | 0 | 111 | N/A | N/A | N/A |
| 2 | 0 | 000 | 0 to 1 | 0 to 2 | $W + W_U$ |
| 2 | 0 | 001 | 0 to 1 | 0 to 3 | $2W$ |
| 2 | 0 | 010 | 0 to 2 | 0 to 4 | $2W + W_U$ |
| 2 | 0 | 011 | 0 to 2 | 0 to 5 | $3W$ |
| 2 | 0 | 100 | 0 to 1 | 1 to 2 | $W$ |
| 2 | 0 | 101 | 0 to 1 | 1 to 3 | $W + W_L$ |
| 2 | 0 | 110 | 0 to 2 | 1 to 4 | $2W$ |
| 2 | 0 | 111 | 0 to 2 | 1 to 5 | $2W + W_L$ |
| 4 | 0 | 000 | 0 to 3 | 0 to 6 | $3W + W_U$ |
| 4 | 0 | 001 | 0 to 3 | 0 to 7 | $4W$ |
| 4 | 0 | 010 | 0 to 4 | 0 to 8 | $4W + W_U$ |
| 4 | 0 | 011 | 0 to 4 | 0 to 9 | $5W$ |
| 4 | 0 | 100 | 0 to 3 | 1 to 6 | $3W$ |
| 4 | 0 | 101 | 0 to 3 | 1 to 7 | $3W + W_L$ |
| 4 | 0 | 110 | 0 to 4 | 1 to 8 | $4W$ |
| 4 | 0 | 111 | 0 to 4 | 1 to 9 | $4W + W_L$ |
| 4 | 1 | 000 | 0 to 5 | 0 to 10 | $5W + W_U$ |
| 4 | 1 | 001 | 0 to 5 | 0 to 11 | $6W$ |
| 4 | 1 | 010 | 0 to 6 | 0 to 13 | $7W$ |
| 4 | 1 | 011 | 0 to 7 | 0 to 15 | $8W$ |
| 4 | 1 | 100 | 0 to 5 | 1 to 10 | $5W$ |
| 4 | 1 | 101 | 0 to 5 | 1 to 11 | $5W + W_L$ |
| 4 | 1 | 110 | 0 to 6 | 1 to 13 | $6W + W_L$ |
| 4 | 1 | 111 | 0 to 7 | 1 to 15 | $7W + W_L$ |

Figure 3:
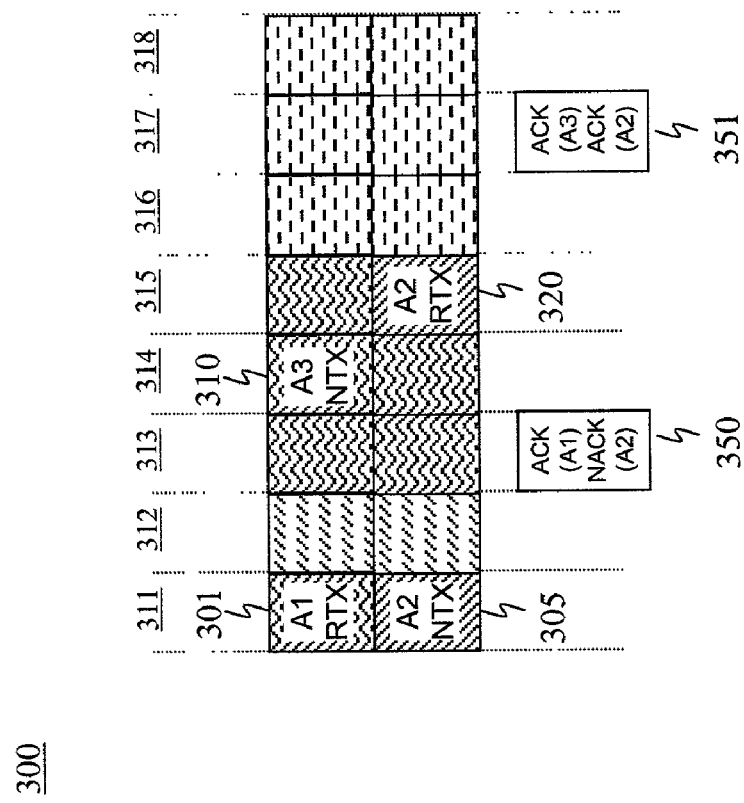
FIG. 3 shows a simplified block diagram of a communication channel format illustrative of acknowledgement and negative acknowledgements according to one exemplary embodiment of the invention.

FIG. 3 illustrates a method for sending acknowledgements (ACKs) and negative acknowledgements (NACKs) to account for the multiple transmissions that may occur within a given time slot. For example, when a new transmission and a retransmission or two new transmissions to the same user ends in the same time slot, a two-level ACK/NACK is needed.

Referring to FIG. 3, a communication channel is shown in which some of time slots 311-318 carry new transmissions (NTX) or retransmissions (RTX) according to well known techniques. For example, a retransmission (RTX) 301 for user A occurs in the upper sub-slot of time slot 311, while a new transmission (NTX) 305 for the same user occurs in lower sub-slot of time slot 311. Similarly, a new transmission (NTX) 310 for user A, which started in the upper sub-slot of time slot 313, ends in the upper sub-slot of time slot 315 while a retransmission (RTX) 320 for user A occurs in the lower sub-slot of time slot 315. According to one illustrative embodiment of the invention, simultaneous ACK/NACKs 350 and 351 are sent from the receiver to the transmitter to account for the aforementioned transmissions. As shown, ACK/NACK 350 includes an acknowledgement (ACK) for user A's previous retransmission, e.g., in time slot 311, and a negative acknowledgement (NACK) for user A's transmission from time slot 311. Similarly, ACK/NACK 351 includes an acknowledgement (ACK) for user A's previous transmission, e.g., which started in the upper sub-slot of time slot 313 and ended in the upper sub-slot of time slot 315, and an acknowledgement (ACK) for user A's retransmission from time slot 315. This two-level ACK/NACK is therefore advantageous for handling multiple transmissions that end within the same time slot. In practice, since the base station knows when it is expecting a two-level ACK/NACK, the receiver can use a 2-bit ACK/NACK feedback format.

In general, the foregoing embodiments are merely illustrative of the principles of the invention. Those skilled in the art will be able to devise numerous arrangements, which, although not explicitly shown or described herein, nevertheless embody those principles that are within the scope of the invention. For example, the invention was described in the context of embodiments where time slots were subdivided into half-slots, but those skilled in the art will appreciate that the time slots can be sub-divided into any number of sub-slots to provide the desired granularity for transmitting information. However, as the number of sub-slots is increased to achieve finer granularity, there is a corresponding tradeoff in terms of the increased overhead that must be used. Of course, this type of modification is a matter of design choice and is contemplated by the teachings herein. Moreover, although the invention was described in the context of sub-dividing time slots using a CDMA scheme, other techniques may also be suitable for sub-dividing the time slots, e.g., sub-dividing into sub-slots according to separate frequencies in a frequency division multiple access (FDMA) scheme, further sub-dividing the time slots in the time domain, and so on. Accordingly, the embodiments shown and described herein are only meant to be illustrative and not limiting in any manner. The scope of the invention is limited only by the claims appended hereto.

We claim:

1. A method for transmitting information in a wireless communication system, the method comprising:
   dividing a data communication channel into a plurality of time slots of equal duration;
   sub-dividing, on other than a time division basis, each of the plurality of time slots to comprise two or more sub-slots, and
   transmitting a plurality of transmissions, each of the transmissions corresponding to a separate transmission of a single user of a wireless communication system and each comprising a number of contiguous sub-slots associated with at least two time slots, where the number of subslots may vary from timeslot to timeslot within each transmission; and
   transmitting a separate, different control channel for each transmission,
   wherein the duration of each separate control channel is dependent upon the number of transmitted sub-slots.

2. The method according to claim 1, wherein each of the two or more contiguous sub-slots is separately transmitted according to a code division multiple access scheme.

3. The method according to claim 2 wherein, in any one of the plurality of time slots, each of a plurality of transmissions are separately coded and carried in a separate sub-slot simultaneously in such time slot.

4. The method according to claim 3 wherein each at least one of the plurality of transmissions corresponds to a separate user of the wireless communication system.

5. The method according to claim 1, wherein each of the two or more sub-slots within a particular time slot corresponds to a different frequency according to a frequency division multiple access scheme.

6. The method according to claim 1, wherein the communication channel comprises time slots each having a duration of 1.25 milliseconds and wherein each of the time slots comprises at least two sub-slots.

7. The method according to claim 1, wherein the communication channel is a forward packet data channel (F-PDCH), wherein information is transmitted as encoder packets in the forward packet data channel (F-PDCH), and wherein the separate control channel is a forward secondary packet data control channel (SPDCCH).

8. The method according to claim 7, wherein the forward secondary packet data control channel (SPDCCH) includes:
a sub-slot start field for identifying a sub-slot within a time slot in which a particular transmission starts; and
a sub-slot count field for identifying the total number of sub-slots that carry the particular transmission.

9. The method according to claim 7, wherein a plurality of forward secondary packet data control channels (SPDCCH) correspond to a plurality of simultaneous transmissions on the forward packet data channel (F-PDCH), and wherein each of the plurality of secondary packet data control channels (SPDCCH) identifies a sub-slot start position within a time slot in which a particular transmission starts.

10. The method according to claim 1, wherein bandwidth in the communication channel is allocated on a fractional basis to carry a plurality of transmissions using a combination of a variable number of contiguous sub-slots and a variable number of contagious time slots.

11. The method according to claim 1, wherein transmissions within the communication channel include two or more transmissions selected from the group consisting of new transmissions, retransmissions, acknowledgements (ACKs), negative acknowledgements (NACKs), and multi-level ACK/NACK message corresponds to multi-level ACK/NACK messages.

12. The method according to claim 11, wherein a multi-level ACK/NACK message corresponds to multiple transmissions that end within the same time slot.

13. A method for transmitting information in a wireless communication system, the method comprising:
dividing a communication channel into a plurality of time slots of equal duration according to a time division multiple access scheme;
sub-dividing each of the plurality of time slots to comprise two or more sub-slots according to a code division multiple access scheme;
transmitting a number of transmissions, each of the transmissions corresponding to a separate transmission of a single user of a wireless communication system and each comprising a number of contiguous sub-slots associated with at least two time slots, where the number of subslots may vary from timeslot to timeslot within each transmission; and
transmitting a separate, different control channel for each transmission,
wherein the duration of each separate control channel is dependent upon the number of transmitted sub-slots.

* * * * *